United States Patent [19]
Martel

[11] Patent Number: 5,642,097
[45] Date of Patent: Jun. 24, 1997

[54] REMOTELY READABLE FUEL TANK INDICATOR SYSTEM

[76] Inventor: Phillip G. Martel, 3 Beaudion Ave., Biddeford, Me. 04005

[21] Appl. No.: 391,369

[22] Filed: Feb. 21, 1995

[51] Int. Cl.⁶ .................................................. G08B 21/00
[52] U.S. Cl. ........................ 340/618; 340/624; 340/625; 340/688; 73/308
[58] Field of Search ........................ 340/618, 623, 340/624, 625; 73/290 R, 305, 308; 344/688

[56] References Cited

U.S. PATENT DOCUMENTS

| | | | |
|---|---|---|---|
| 4,290,059 | 9/1981 | Noyer et al. | 340/624 |
| 4,845,486 | 7/1989 | Knight et al. | 340/623 |
| 4,924,221 | 5/1990 | Fillippone | 340/625 |
| 4,967,181 | 10/1990 | Iizuka et al. | 340/618 |
| 4,975,687 | 12/1990 | Murphy, Jr. et al. | 340/688 |
| 5,023,806 | 6/1991 | Patel | 340/625 |
| 5,121,109 | 6/1992 | Murphy, Jr. et al. | 340/688 |
| 5,305,639 | 4/1994 | Pontefract | 340/625 |

*Primary Examiner*—Jeffery Hofsass
*Assistant Examiner*—Daniel J. Wu
*Attorney, Agent, or Firm*—Frederick R. Cantor, Esq.

[57] ABSTRACT

A residential oil-fired furnace heating system includes an oil storage tank having a fuel level gauge, and a second fuel level indicator located in a zone remote from the fuel oil storage tank. The homeowner can read the oil level from the second indicator without having to go down into the basement or other area where the tank might be located. The second indicator can have an alarm device that is triggered when the indicator reading reaches the near-empty reading. The alarm device alerts the homeowner that it is time to reorder a new supply of fuel oil.

1 Claim, 1 Drawing Sheet

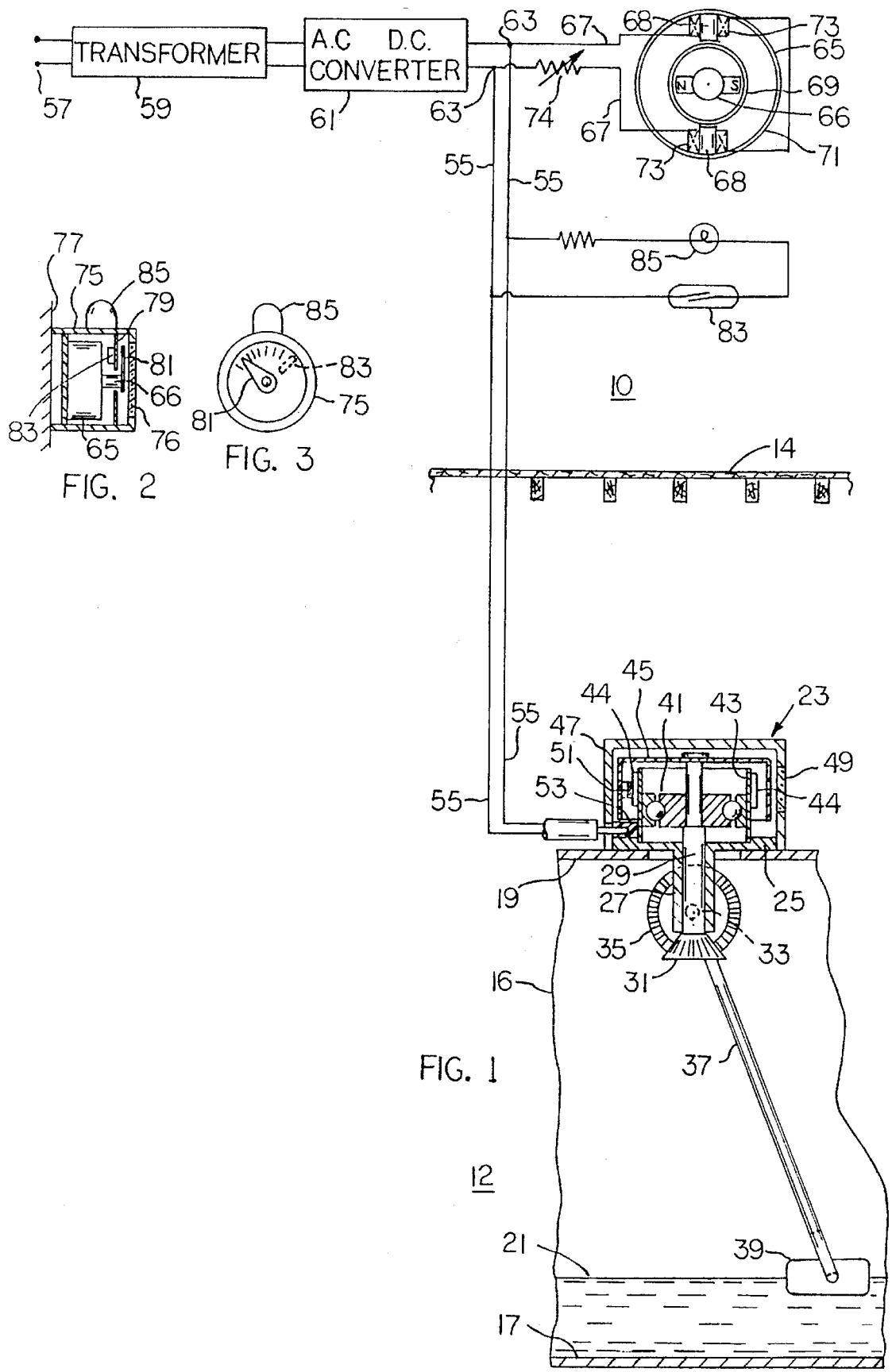

REMOTELY READABLE FUEL TANK INDICATOR SYSTEM

BACKGROUND OF THE PRESENT INVENTION & SUMMARY OF THE PRESENT INVENTION

The present invention relates to a novel remotely readable fuel tank indicator system.

The present invention, more particularly, relates to a novel remotely readable fuel tank indicator system, e.g., a system associated with a fuel tank for supplying fuel oil to the burner of a residential furnace.

One common residential heating system comprises an oil-fired furnace supplied with fuel oil from a closed tank located in the basement of the residence. Typically, the tank has a gauge projecting from the tank upper surface to indicate the quantity of fuel oil in the tank. The homeowner periodically notes the reading on the gauge, and orders a new supply of fuel oil when the tank reaches a near empty condition, e.g., when the tank is about one-eighth full.

Since the fuel tank is usually in the basement (or sometimes outdoors), the homeowner may not have occasion to look at the gauge every day. Several days may elapse before the homeowner has any reason to go into the basement, or area, where the oil fuel tank is located. Should the homeowner fail to read the gauge, or concern himself with the task of reordering a new fuel oil supply, then it becomes possible for the fuel tank to run dry, causing a furnace shutdown and a cold residence.

The present invention is directed to a remotely readable fuel tank indicator system that includes a second indicator gauge located in the main living area of the residence, e.g., on the first floor near the room thermostat that is used to set the temperature of the rooms being heated by the furnace.

This second indicator gauge is electrically connected to a variable resistance means associated with the indicator on the fuel tank (usually in the basement), such that the second indicator gauge provides a duplicate reading of the fuel oil level in the tank. The homeowner can ascertain the tank fuel oil level without going down into the basement.

As indicated above, the second (duplicate) indicator is preferably located on a room wall near the conventional room thermostat. When the homeowner sets the room thermostat, to adjust the room temperature, he can at the same time automatically glance at the duplicate fuel oil level indicator so as to be aware of how much fuel oil there is in the tank. He, or she, is therefore more likely to be in a position to order a new supply of fuel oil in sufficient time to prevent a furnace shut down. Also, the homeowner acquires the necessary information without having to take one or more trips down to the basement (or outdoors if the tank happens to be located outdoors).

As a further feature of the invention, the duplicate indicator gauge may be provided with an alarm that is triggered when the fuel oil level in the tank reaches a near-empty condition, e.g., one-tenth full, corresponding to a few days supply of fuel. The alarm can take various forms, e.g., a small indicator light or an audible buzzer.

When the alarm is energized the homeowner is instantly reminded that it is time to order a new supply of fuel; this reminder is automatic, whether or not the homeowner reads the duplicate (first floor) gauge.

The invention can be practiced in various forms and arrangements. However, the features and construction of an illustrative form of the invention will become apparent from the attached drawings and accompanying description.

In summary, and in accordance with the above discussion, the forgoing objectives are achieved in the following embodiments:

1. A remotely readable fuel tank indicator system for a residential heating system, comprising:

a first fuel tank level gauge that includes a potentiometer resistance and an electrical slider movable along said resistance in accordance with changes in the tank level;

a D.C. current source remote from said first indicator;

an indicator remote from said gauge;

said indicator comprising a rotary stepper motor, and visually readable means mechanically connected to said motor for indicating the motor rotational position;

a first electrical circuit interconnecting said D.C. source with said potentiometer resistance and slider in said gauge;

a second electrical circuit interconnecting said D.C. source and said motor; and said electrical circuits being connected together so that said visual means provides a readout of the fuel tank level detected by said gauge.

2. The indicator system, as described in paragraph 1, wherein said D.C. current source comprising a residential source of A.C. current, a step down transformer connected to said A.C. current source, and an A.C. to D.C. converter.

3. The indicator system, as described in paragraph 1, wherein said first and second electrical circuits are connected to the D.C. source so as to be in electrical parallelism with each other.

4. The indicator system, as described in paragraph 1, and further comprising a low fuel level alarm means associated with said indicator.

5. The indicator system, as described in paragraph 1, and further comprising a low fuel level alarm means associated with said indicator; and said alarm means comprising an electrical signal means and a proximity switch connected in series to said D.C. current source.

6. The indicator system, as described in paragraph 5, wherein said proximity switch is located alongside the path taken by said visually readable means so that when said visually readable means reaches a low tank level position the proximity switch is actuated to energize said alarm means.

7. The indicator system, as described in paragraph 6, wherein said visually readable means comprises a rotary pointer, and said alarm means comprises an electrical light.

8. The indicator system, as described in paragraph 7, wherein said visually readable means comprises a stationary dial and a rotary pointer movable along the front face of said dial; and said proximity switch being located on the rear face of said dial alongside the path taken by the pointer.

9. The indicator system, as described in paragraph 1, wherein said second fuel tank level indicator is located on the first floor of the residence in near proximity to the room thermostat that sets the temperature to be maintained by the residential heating system.

10. The indicator system, as described in paragraph 1, wherein said gauge comprises a rotor having markings thereon indicative of the tank fuel level; and said electrical slider being mounted on said rotor.

11. The indicator system, as described in paragraph 1, wherein said gauge comprises a rotor having markings thereon indicative of the tank fuel level;

said electrical slider being mounted on said rotor;

said visually readable means comprising a pointer affixed to the shaft of said stepper motor;

a low fuel level alarm means in said indicator;

said alarm means comprising an electric light and a proximity switch controlling said light; and said proximity switch being located alongside the path taken by said pointer so that the switch is actuated when the pointer reaches a low tank level position.

BRIEF DESCRIPTION OF THE DRAWINGS

FIG. 1, is an elevational view, of a residential area equipped with a fuel tank indicator system of the present invention. Some components of the system are shown schematically. Some components are shown in section.

FIG. 2, is a cross sectional view, taken through an indicator mechanism used in the FIG. 1 system.

FIG. 3, is a front elevational view, of the FIG. 2 indicator mechanism.

DESCRIPTION OF THE PREFERRED EMBODIMENT OF THE PRESENT INVENTION

FIG. 1, is an elevational view, of a residential area equipped with a fuel tank indicator system of the present invention. Some components of the system are shown schematically. Some components are shown in section.

FIG. 1, shows in fragmentary form a residence, i.e., a home or apartment, having a first floor living area 10 and a basement area 12. The two areas are separated by a floor 14.

Disposed in the basement area 12 is a fuel oil storage tank 16, having a bottom wall 17 and a top wall 19. The tank 16 is shown partially filled with fuel oil to a level indicated by numeral 21.

Tank 16 serves as a storage tank for oil that is to be supplied to an oil-fired furnace, whereby the residence is heated to a desired comfort level during the relatively cold winter months. Periodically, it becomes necessary to refill the tank 16 with a new supply of fuel oil (through a threaded pipe connection, not shown). A fuel level gauge 23 is provided on the tank 16 to enable the homeowner to know when it becomes necessary to order a new supply of oil from the oil supply company.

As shown in FIG. 1, the liquid level gauge (or indicator) 23 comprises a mounting plate 25 detachably secured to the tank top wall 19. The mounting plate 25 has a depending sleeve bearing 27 for a vertical shaft 29 that carries a gear 31 at its lower end. A transverse horizontal shaft 33 extends from sleeve bearing 27 to rotatably support a second gear 35 that is in mesh with gear 31.

Gear 35 is affixed to an elongated rod, or arm, 37, that has a swivel connection with a float 39 riding on the oil surface within tank 16. As the oil level rises, or falls, the float changes position so as to produce rotary motion of gear 35. Gear 35 drives the associated gear 31, whereby shaft 29 rotates around its axis.

Shaft 29 is suspended in sleeve 27 by an anti-friction bearing 41. The outer race of bearing 41 is secured to an upstanding cylinder 43 suitably supported on plate 25. A potentiometer resistance 44 is located on the outer surface of cylinder 43, so as to encompass a substantial circumferential portion of the cylinder 43; preferably the potentiometric resistance extends around at least three hundred (300) degrees of the cylinder 43 circumference.

Gear 35, preferably has a larger diameter than the associated gear 31, so that shaft 29 has a substantial rotary motion around the shaft axis during each complete excursion of the float 39 between the full tank position and the empty tank position. Assuming that float 39 has a maximum travel of about ninety (90) degrees around the axis of shaft 33, the gearing can be designed to produce a corresponding rotational motion of shaft 29 measuring about two hundred seventy (270) degrees around the shaft 29 axis.

The upper end of shaft 29 is attached to an inverted cup-shaped rotor 45 whose cylindrical side wall extends within an annular space defined by cylinder 43 and cylindrical housing 47 (that is detachably secured to plate 25). Housing 47 has a transparent window 49 that is printed with a pointer (or reference point). The cylindrical side wall of rotor 45 has numerical gradations on its outer surface designating different liquid level conditions, e.g., full, ½, ¼, etc. The reference point and numerical gradations are visible through window 49, such that a person facing the gauge can read the fuel level on the rotor so as to know whether or not it is time to order a new supply of fuel oil.

The inner surface of the rotor 45 side wall carries an electrical slider 51 that is in physical contact with the potentiometric resistance 44 on stationary cylinder 43. As the slider 51 moves along the potentiometric resistance, the effective resistance of the associated electrical circuit is varied, according to the rotated position of rotor 45 and the corresponding liquid level in tank 16.

A terminal board 53 provides electrical connections between slider 51 and resistance 44, and insulated lead wires 55. Current is supplied to lead wires 55 by a circuit that includes the conventional household A.C. supply 57, a step down transformer 59, and an A.C. - D.C. converter 61. Terminals 63 on the output side of converter 61 are supplied with direct current at relatively low voltage. Lead wires 55 form one circuit for carrying some of the low voltage current through slider 51 and potentiometric resistance 44.

A second circuit is connected across terminals 63 through a stepper motor 65. This second circuit comprises lead wires 67 and the stepper motor 65 in electrical parallelism with the circuit defined by lead wires 55, the slider 51, and resistance 44 in gauge 23.

Stepper motor 65 may be a known type of motor, wherein the rotated position of the motor shaft is controlled by the magnitude of the current supplied across the motor terminals. U.S. Pat. No. 4,447,793 to W. P. Gray, shows a motor construction that can be used.

As shown schematically in FIG. 1 herein, the motor 65 comprises a rotary shaft 66 carrying a permanent magnet so that the magnet poles move toward or away from stationary pole pieces 68 located between inner and outer flux rings 69 and 71. Electrical windings 73 are energized by the current supplied by lead wires 67, to establish opposite magnetic polarities at the inner ends of pole pieces 68.

The magnetic polarities provided by the shaft magnet interact with the electrically-produced magnetic polarities on pole pieces 68 to produce a deflection of shaft 66 that is related to the magnitude of the current supplied by lead wires 67. The motor operates in the same fashion as the motor shown in U.S. Pat. No. 4,447,793. Maximum shaft deflection of the illustrated motor is ninety (90) degrees, measured around the shaft 66 axis.

The slider-resistance combination in gauge 23 serves to control the shaft deflection in motor 65, by diverting some of the D.C. current appearing at terminals 63. Thus, the deflected position of motor shaft 65 is indirectly controlled by the liquid level in tank 16 (as sensed by gauge 23). The system can be initially calibrated by a small variable resistance 74 located in one of the lead lines 67.

FIG. 2, is a cross sectional view, taken through an indicator mechanism used in the FIG. 1 system.

FIG. 3, is a front elevational view, of the FIG. 2 indicator mechanism.

FIG. 2 shows stepper motor 65 mounted within a cup-shaped indicator casing or housing 75, that is suitably supported on a room wall 77. The motor shaft 66 extends through a fixed dial plate 79, with its front end connected to a pointer 81. As the motor shaft 66 rotates, pointer 81 moves across gradation markings on the front surface of the dial plate 79. Indicator housing 75 has a transparent window 76 therein, that enables the homeowner to view pointer 81 and the dial plate 79. Preferably, the gradation markings on plate 79 are similar to those printed on the rotor 45 in gauge 23, so that the homeowner can obtain similar readings from the two indicator devices (i.e., the gauge 23 shown in FIG. 1, and the indicator shown in FIGS. 2 and 3).

The indicator of FIGS. 2 and 3 is preferably located in the first floor of the living area, not in the basement, so that the homeowner can obtain a fuel oil level reading without going down into the basement. A preferred location of the FIG. 2 indicator is on a room wall in near proximity to the room thermostat that is used by the homeowner to set the temperature that is to be maintained by the furnace heating system. Each time the homeowner sets (adjusts) the thermostat or scans the thermostat temperature reading, he can, at the same time, note the oil fuel level on the FIG. 2 indicator.

As a further feature of the invention, the FIG. 2 indicator is provided with an alarm means signifying a low fuel oil level in tank 16, e.g., a level equivalent to one-tenth of the tank capacity. The alarm can be an audible alarm, e.g., a buzzer; or a visible alarm, e.g., an illuminated light bulb. When the alarm means is energized the homeowner is alerted to the fact that the tank is sufficiently depleted of oil, so that a new supply has to be ordered immediately in order to avert a possible furnace shut down.

As shown in FIGS. 1, 2 and 3, the alarm means comprises a small proximity switch 83 mounted behind, or on, the rear face of dial plate 79. As shown in FIG. 1, proximity switch 83 is in an electrical circuit that includes an electric light 85; light 85 constitutes an alarm. Light 85 can be a low current consumption device, such as a light-emitting diode. If desired, the light can be in series with a conventional flasher switch, whereby the light (LED) can have a flashing on-off operating mode when the associated proximity switch 83 is in a circuit-closed condition.

The position of proximity switch 83 on dial plate 79 is selected so that the switch is located along the path taken by pointer 81 as it nears the tank-empty position. Pointer 81 comprises, or contains, a ferro magnetic material so that when the pointer reaches a particular point on the dial the proximity switch is actuated, so as to energize the alarm device 85. If desired, a manual on-off switch can be incorporated in the circuit containing switch 83 and light 85, whereby the alarm can be manually disabled after the alarm signal has been generated.

The drawings show one particular form of the invention. However, it will be appreciated that the invention can be practiced in various forms and arrangements. A major feature of the invention is that the second remote indicator is located in the main living area of the residence remote from the fuel oil tank, whereby the homeowner can read the oil level without having to take a trip into the basement, or other area, where the tank might be located.

The present invention, described above, relates to a Remotely readable fuel tank indicator. Features of the present invention are recited in the appended claims. The drawings contained herein necessarily depict structural features and embodiments of the Remotely readable fuel tank indicator, useful in the practice of the present invention.

However, it will be appreciated by those skilled in the arts pertaining thereto, that the present invention can be practiced in various alternate forms and configurations. Further, the previous detailed descriptions of the preferred embodiments of the present invention are presented for the purpose of clarity of understanding only, and no unnecessary limitations should be implied therefrom. Finally, all appropriate mechanical and functional equivalents to the above, which may be obvious to those skilled in the arts pertaining thereto, are considered to be encompassed within the claims of the present invention.

What is claimed:

1. A remotely readable fuel tank indicator system for a residential heating system, comprising:

a fuel tank level gauge that includes a housing (47) having a transparent sighting window, a rotor having tank level markings thereon, visible through said window, a stationary potentiometer resistance concentric with said rotor, and an electrical slider mounted on said rotor for movement along said resistance in accordance with changes in the tank level;

a D.C. current source remote from said gauge;

a tank liquid level indicator means remote from said gauge;

said indicator means comprising a casing (75) having a viewing window (76), a rotary stepper motor within said casing, and a visually readable pointer (81) mechanically connected to said motor; said pointer being aligned with said viewing window for indicating the motor rotational position;

a first electrical circuit interconnecting said D.C. source with said potentiometer resistance and slider in said gauge;

a second electrical circuit interconnecting said D.C. source and said motor;

said first and second electrical circuits being connected in electrical parallelism so that said pointer provides a readout of the fuel tank level detected by said gauge;

an electrical alarm circuit energized by said D.C. source in parallel with said first and second electrical circuits;

a low fuel level alarm means associated with said liquid level indicator means;

said alarm means comprising an electric alarm element (85) and a proximity switch (83) controlling current flow through said alarm element;

said alarm element and said proximity switch being electrically located in said alarm circuit; and said proximity switch being located within said casing alongside the path taken by said pointer so that said switch is actuated when the pointer reaches a low tank level position.

\* \* \* \* \*